June 10, 1924.
C. F. GREEN
WEATHER EXCLUDING MEANS
Filed May 3, 1918
1,497,140
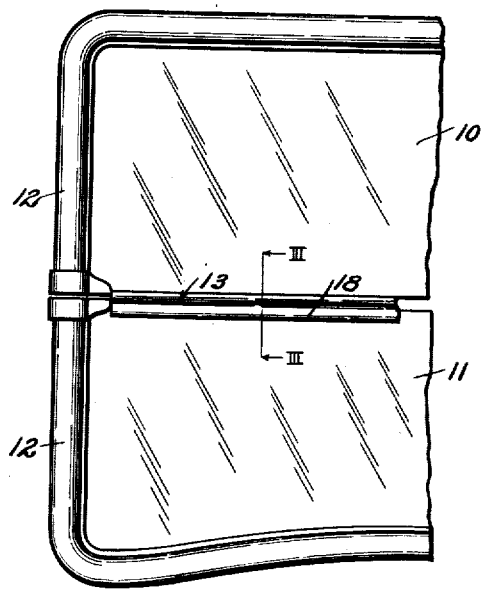
Fig. I.
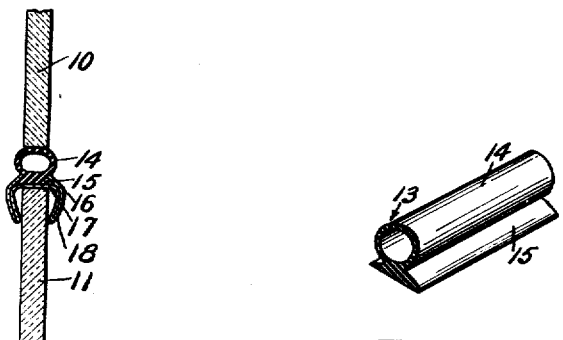
Fig. III.
Fig. II.
INVENTOR.
Charles F. Green
BY Chester H. Braselton
ATTORNEY Patented June 10, 1924.

1,497,140

UNITED STATES PATENT OFFICE.

CHARLES F. GREEN, OF TOLEDO, OHIO, ASSIGNOR TO INDUSTRIAL RESEARCH CORPORATION, OF TOLEDO, OHIO, A CORPORATION OF DELAWARE.

WEATHER-EXCLUDING MEANS.

Application filed May 3, 1918. Serial No. 232,240.

*To all whom it may concern:*

Be it known that I, CHARLES F. GREEN, a citizen of the United States, residing at Toledo, in the county of Lucas and State of Ohio, have invented certain new and useful Improvements in Weather-Excluding Means, of which I declare the following to be a full, clear, and exact description.

This invention relates to weather excluding means and more particularly to an improved form of weather strip and securing means therefor.

The principal object of the invention is to construct a weather strip which is simple and neat in construction, readily applied for use and effectively prevents rain, wind and cold from entering between two sashes or corresponding members and which, at the same time, is readily adapted for use in various relations.

Other objects of the invention are to construct a tubular elastic member with an improved form of securing means adapted to be mounted in an improved form of metal attaching device.

Further objects, and objects relating to economies of manufacture and details of construction, will definitely appear from the detailed description to follow:

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which:

Fig. I is a side elevation of a portion of a vehicle windshield to which my invention is shown applied in the drawings for the sake of illustration, Fig. II is a perspective view of part of the flexible elastic member of the weather excluding means.

Fig. III is a detail, cross-sectional view taken on the line III—III of Figure 1 showing the adjacent portions of two panes of glass of two windshield sections, and the improved weather excluding means mounted in the space between the adjacent edges of the panes of glass.

Considering the numbered parts of the drawing, the windshield comprises an upper glass section 10 and a lower glass section 11. Each glass section is carried in the usual form of frame 12 which extends around three sides of the glass section. The frame 12 is preferably formed of metal and is provided with a channel in which the edges of the glass section are mounted. The two windshield sections may be pivoted in any desired manner to standards or supports (not shown) mounted on the vehicle body, or may be pivotally mounted in the front opening of the vehicle body, depending on the style of body in which it is desired to mount the windshield.

The weather excluding means comprises a flexible elastic strip 13 which is preferably formed of rubber, and this strip has a hollow tubular portion 14 and a securing portion 15 extending the length of the tubular portion. The securing portion 15 is integral with a tubular portion 14 and is substantially triangular in cross section, the sides converging towards each other, away from the base and towards the tubular portion.

In Figure III a pane of glass 10 in an upper windshield section is shown in alignment with a pane of glass 11 of a lower windshield section. These windshield sections, which are not shown in detail, are pivotally mounted in the front opening of the vehicle body, as is well known.

The rubber strip 13 is shown as closing the space between the adjacent ends of the panes of glass 10 and 11. The triangular portion 15 of the rubber member 13 is mounted in a channel member 16. This channel member is formed from a strip of sheet metal which is bent to form a channel having a base 17 and sides 18 which extend downwardly and converge towards each other. The lower ends of the sides 18 resiliently grip the opposite sides of the upper portion of the glass 11, the base 17 being seated on the edge. As the sides 18 resiliently grip opposite sides of the glass 11, it can be seen that the channel member may be held in position due to its own resilient character and that therefore the member is readily removable without the use of tools. The sides 18 at their lower edge are bent back upon themselves to form sides of double thickness and the marginal portions of the strip, which then form the upper ends of the bent back portions project over the base 17 to form a channel therewith. The projecting or marginal portions converge towards each other so that when the triangular portion of the strip is mounted in a channel formed thereby, they resiliently grip the inclined sides of the triangular portion 15 to firmly retain the latter in position on the channel member.

As shown, when the two windshield sections are in an alignment, the tubular portion 14 engages the lower edge of the glass 10 and is slightly flattened so as to form an effective weather excluding means. It is also apparent that either windshield section may be swung forwardly or rearwardly into or out of alignment with the other section as the tubular portion of the rubber strip is adapted to wipe across and past the lower edge of a glass 10, the sides of the lower edge being slightly curved or beveled to prevent injury or cutting of the tubular portion of the rubber strip 13. It is also clear that the channel member 16 may be mounted on the lower edge of the upper pane of glass 10 instead of the lower pane if desired.

It is thought from the above description that my invention will be readily understood. It is obvious that the same form of rubber strip as used between the windshield sections is readily adapted for use any place within the vehicle body where a weather-strip or bumper strip is usually employed and this is important as it eliminates the necessity of employing a number of different forms of weatherstrips, each constructed for use in a particular place only. Furthermore, the weatherstrip serves not only as an effective weather excluding means, but also as a bumper and as a means for preventing rattle. The rubber strip is simple and readily mounted into the metal channel members which also have a simple and economical construction.

While I have shown and described my invention as being applied between the adjacent edges of the windshield sections, it is obvious that such means may be used in any connection as a weatherstrip and also as a bumper and it is not intended to limit the invention to the specific form or the specific application shown herein.

Having thus described my invention, what I claim as new and desire to secure by Letters Patent, is:

1. The combination with two elements, of weather excluding means comprising a flexible elastic member having a weather excluding portion adapted to engage one of said elements and a securing portion, and a sheet metal strip bent to form a channel having a base and converging resilient sides, the sides being bent back upon themselves at their ends so that the marginal portions of the strip project past said base to form a second channel therewith, the securing portion of the elastic member being mounted in and resiliently gripped by the sides of said second channel and the edge of one of the elements being mounted in and resiliently gripped by the sides of the first channel.

2. The combination with two elements, of weather excluding means comprising an elastic member having a tubular portion adapted to engage one of said elements and a securing portion extending the length of said tubular portion and having converging sides, and a sheet metal strip bent to form a channel having a base and sides, the sides being bent back upon themselves at their ends so that the marginal portions of said strip project past said base and converge toward each other to form a second channel, the securing portion of said elastic member being mounted in said second channel so that the sides thereof engage the converging sides of said securing portion and the edge of one of the elements being mounted in said first channel.

3. The combination with two elements, of weather excluding means comprising an elastic member having a tubular portion adapted to engage one of said elements and a securing portion extending the length of said tubular portion and having converging sides, and a sheet metal strip bent to form a channel having a base and sides, the sides being bent back and lying in close contact upon themselves at their ends so that the marginal portions of said strip project past said base and converge toward each other to form a second channel, the securing portion of said elastic member being mounted in said second channel so that the sides thereof resiliently grip the converging sides of said securing portion and the edge of one of the elements being mounted in said first channel.

4. The combination with two elements, of weather excluding means comprising an elastic member having a tubular portion adapted to engage one of said elements and a securing portion extending the length of said tubular portion and having converging sides, and a sheet metal strip bent to form a channel having a base and converging sides, the sides being bent back upon themselves at their ends so that the marginal portions of said strip project past said base, and converge toward each other to form a second channel, the securing portion of said elastic member being mounted in said second channel so that the sides thereof resiliently grip the converging sides of said securing portion and the edge of one of the elements being mounted in said first channel and resiliently gripped by the sides thereof.

5. An elastic weather strip, comprising a web, two normally converging flanges extending from opposite edges of the same side of the web, and a compressible member secured above the web to form a longitudinally extending chamber.

6. An elastic weather strip, comprising a web, two normally converging flanges extending from opposite edges of the same side of the web, and a tubular compressible member secured to the other side of the web to form a longitudinally extending chamber.

7. An elastic weather strip, comprising a web, two flanges extending from opposite sides of the same side of the web, and a compressible tubular member secured to the other side of the web to form a longitudinally extending chamber.

In testimony whereof, I affix my signature.

CHARLES F. GREEN.

Certificate of Correction.

It is hereby certified that in Letters Patent No. 1,497,140, granted June 10, 1924, to Charles F. Green, of Toledo, Ohio, for an improvement in " Weather-Excluding Means," errors appear in the printed specification requiring correction as follows: Page 2, line 79, claim 2, and line 115, claim 4, after the word " strip " insert the words *lie in close contact with the respective edges of the base and;* and that the said Letters Patent should be read with these corrections therein that the same may conform to the record of the case in the Patent Office.

Signed and sealed this 14th day of October, A. D. 1924.

[SEAL.]
KARL FENNING,
*Acting Commissioner of Patents.*